United States Patent [19]

Cherry

[11] 3,824,693

[45] July 23, 1974

[54] NAVIGATIONAL DEVICES

[76] Inventor: Kenneth Floyd Cherry, 1533 Eastgate St., Toldeo, Ohio 43614

[22] Filed: Feb. 26, 1973

[21] Appl. No.: 335,583

[52] U.S. Cl. .................................. 33/76 R, 33/102
[51] Int. Cl. ........................ B43l 7/06, B43l 13/08
[58] Field of Search ....... 33/76 R, 76 VA, 77 R, 97, 33/1 MP, 102

[56] References Cited
UNITED STATES PATENTS

| 632,821 | 9/1899 | Mitchell | 33/76 |
| 1,442,710 | 1/1923 | Webster | 33/76 |
| 2,739,385 | 3/1956 | Eastman et al. | 33/76 |

FOREIGN PATENTS OR APPLICATIONS

| 998,966 | 9/1951 | France | 33/76 |

Primary Examiner—Louis R. Prince
Assistant Examiner—Richard R. Stearns

[57] ABSTRACT

The multi-arm navigational device is an improvement in navigational chart instruments. Movable arm protractors fitted in tracks and placed over the chart eliminate some operations in alignment and/or drawing in common navigational problems, thereby resulting in a decrease of time and effort in solving the problems.

1 Claim, 4 Drawing Figures

PATENTED JUL 23 1974  3,824,693

NAVIGATIONAL DEVICES

SUMMARY OF DISCLOSURE

A reduction in time and effort in solving basic navigational problems can be realized by using a multi-arm navigational device. The device is composed of a track with movable swing arm protractors so mounted as to retain the protractors' directional orientation relative to the chart being used. The arms of the protractors are constructed so as to indicate a straight line over the chart at any angle desired, as read from the protractor scale. Suitable marking to orient the protractors relative to the chart being used may be fixed to the track and a method of preventing movement of the device relative to the chart may be used when the intended use warrants. Using the swing arm in conjunction with, or in lieu of, conventional line of position, bearing lines and other navigational construction drawings on the charts' surface results in a reduction in time and effort required for solving appropriate navigational problems.

An improved method of performing some navigational functions can be realized using the multi-armed plotting instrument herein described. The necessary time and effort involved in orienting a protractor or parallel rules with the compass rose on a chart and drawing lines on the chart's surface can be reduced using the multi-armed plotting instrument. The instrument consists of a track and one or more similar protractors so fitted in the track as to allow movement in the track while maintaining a predetermined relative orientation between the protractor's scale and some reference. The protractor and arm are similar to the course protractor now in common use and described as follows:

Each protractor is to be fitted with an arm which can rotate about the protractor. Each arm to have the following characteristics:

a. Movable about the center of the protractor and adjustable to any angle on the protractor.

b. To be marked or shaped as to indicate an angle value on the protractor.

c. To be marked or cut so as to indicate a straight line on the surface of the chart through the center of the protractor corresponding to the angle value in characteristic "b".

d. To be made of a transparent or translucent material allowing markings on the chart to be seen through the arm.

e. May have a movable indicator on the arm to indicate and retain a distance from the protractor's center.

f. May have a scale inscribed to allow direct measurement of distance on a chart.

The device is to have suitable markings on the edge of the track and/or on a transparent sheet attached to the tracks on a plane parallel to the plane of movement of the protractors, to facilitate alignment of the entire device relative to the directional orientation of the chart. Further, the device may have clips or a hinged back to prevent movement of the device relative to the chart.

BRIEF DESCRIPTION OF THE DRAWING

In order that the invention may be more clearly understood, reference is made to the accompanying drawings which are not drawn to scale. FIG. 1 is a top view as seen when using the instrument. Numeral 1 refers to the protractor assembly which is fitted into the track designated 2. The alignment marks 3 are etched into the clear or translucent rectangular piece which comprises the base of the instrument. FIG. 2 is a top view of the protractor assembly showing the position of the standard swing arm protractor mounted on the assembly fitted into the track. Section B—B of FIG. 2 is shown in FIG. 3 and shows a side view of the swing arm protractor as mounted on the assembly and numeral 5 of this figure shows the position of the swing arm. FIG. 4 is section A—A of FIG. 1. This shows the track 2 and the transparent or translucent base sheet 4 and their relative positions.

Figure 2:
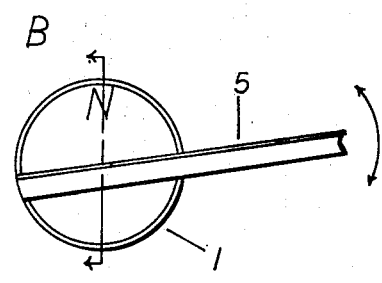
FIG. 2 shows a top view of one of the protractor assemblies of the invention.
Figure 3:
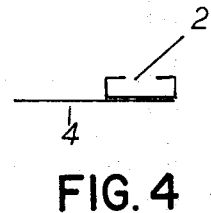
FIG. 3 shows a cross sectional view of the protractor assembly taken across line B—B of FIG. 2.
Figure 4:
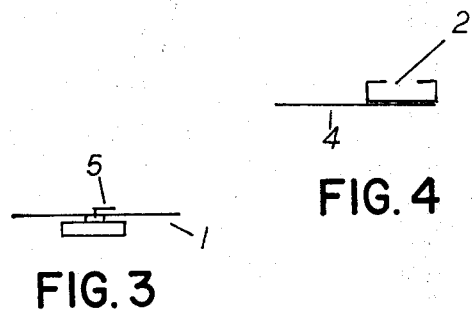
FIG. 4 shows a cross sectional view of a track taken across line A—A of FIG. 1.

It can be seen that the rectangular assembly in FIG. 2 when fitted into the track shown in FIG. 4 can move about the entire track and that if a line were inscribed on the assembly parallel to one of the sides of the track, that inscribed line would remain parallel to said side of track as the assembly were moved about the entire track.

The invention shown in the drawings described herein may be described as a navigational device comprising a rectangular track and multiple 360° course protractors, each protractor mounted on an assembly fitted in said track. The aforementioned track is constructed with a continuous slotted center and has complementary markings on opposing sections of tracks indicating lines parallel to the adjacent section of the track. Each protractor is to be mounted on an assembly which fits into the tracks and can move around the entire rectangle formed by the track. Each assembly has a base, rectangular in shape, which is fitted to the track so that a line inscribed on the assembly parallel to a section of track will remain parallel to that section of track as the assembly is moved about the entire track. Each protractor is mounted on such said assembly so that the friction between the assembly and protractor is sufficient to prevent movement of the protractor relative to the assembly during use of the device, but allowing movement of the protractor on the assembly with hand pressure. The protractor assembly combination is constructed with a post seated in the assembly and projecting through the center of the protractor with an arm mounted on said post. The arm is movable on said post and constructed so as to indicate a straight line through the center of the protractor, said arm is of a length approximately equal to the diagonal of the rectangular track. Said arm is movable by hand pressure about said post.

Figure 1:
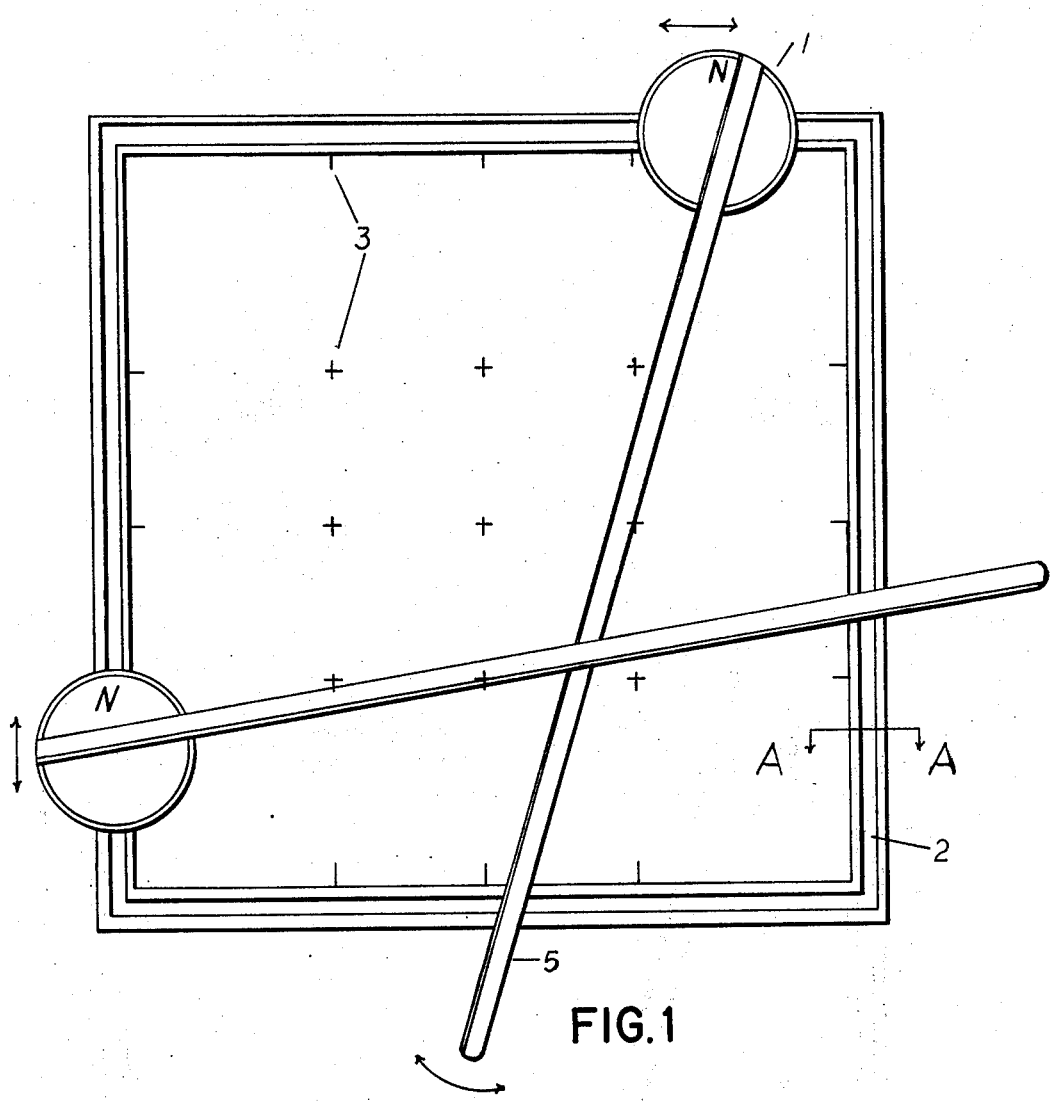
FIG. 1 illustrates the multi-arm navigational device which comprises this invention.

FIG. 4 shows a cross sectional view of a track taken across line A—A of FIG. 1.

METHOD OF INTENDED USE

Once aligned with the chart the device allows movement of the swing arms on the protractors and over the surface of the chart so as to indicate or measure a line of position, course line or other navigational line, distance, or angle on the chart without reorienting each protractor or drawing all the lines on the chart's surface. Lines and directions indicated by the instrument are then used in a similar manner to those lines and lines of direction conventionally drawn upon the chart's surface.

It can be seen from the above disclosure that the device is a new, and improved tool for use in navigation. It should also be noted that no section of this disclosure or following claims is an attempt to patent the course protractor now in common use; however, it is by necessity incorporated into various descriptions included in this document.

Having described the invention in detail it is desired to claim:

1. A navigational device comprising a generally flat base member having a continuous track means arranged in a rectangular configuration mounted thereon, said track means having bottom, top and side paortions defining a continuous rectangularly cross sectioned channel extending entirely around said rectangular configuration, and said top portion having a centrally located continuous slot therein extending entirely around said rectangular configuration; at least one protractor assembly, each protractor assembly including a rectangular block member slidable in said channel, the relative orientation of said block member with respect to said base member remaining unchanged as said block is moved around said rectangular configuration: mounting means attached to the top surface of said block member and extending through said slot; a swing arm protractor being rotatably mounted on said mounting means, said protractor being in frictional engagement with the mounting means to allow rotational movement of the protractor rose with respect to said block member with the application of moderate hand pressure, and at the same time, said frictional engagement being sufficient to allow movement of said swing arm with respect to said protractor rose.

* * * * *